(No Model.)

R. JONES.
CAR COUPLING.

No. 368,214.   Patented Aug. 16, 1887.

WITNESSES:
A. P. Wood
Henry A. Keppel

INVENTOR:
Reuben Jones
By Albert A. Wood
Attorney.

UNITED STATES PATENT OFFICE.

REUBEN JONES, OF ATLANTA, GEORGIA, ASSIGNOR OF TWO-THIRDS TO JOHN A. FITTEN, OF SAME PLACE, AND JOHN B. GORDON, OF DE KALB COUNTY, GEORGIA.

CAR-COUPLING.

SPECIFICATION forming part of Letters Patent No. 368,214, dated August 16, 1887.

Application filed May 11, 1887. Serial No. 237,910. (No model.)

*To all whom it may concern:*

Be it known that I, REUBEN JONES, a citizen of the United States, residing at Atlanta, in the county of Fulton and State of Georgia, have invented a new and useful Car-Coupling; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to automatic car-couplings, and has for its object the supplying of a car-coupling that shall be automatic and certain in its action, and capable of being readily handled and in such a manner as to most effectually prevent accidents.

The invention consists, in connection with the draw-head, of a gravitating hook having a sloping forward end for the purpose of allowing the incoming link to raise it, and a rock-shaft provided with cams adapted to impinge on an upwardly-projecting arm on the hook and raise the hook, holding it in suspension or not, as desired, and to depress the hook, carrying downwardly the inner end of the hook, and, in conjunction with an upward projection in the bottom of the interior of the draw-head, forming a fulcrum, raising the outer end, and an elastic contact with the dead-block of the car, as will be hereinafter fully described, and then specifically claimed.

Figure 2:
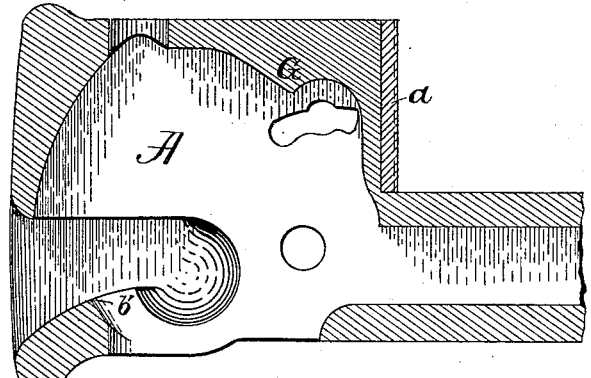
Figure 3:
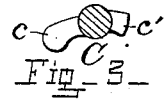
Figure 1:
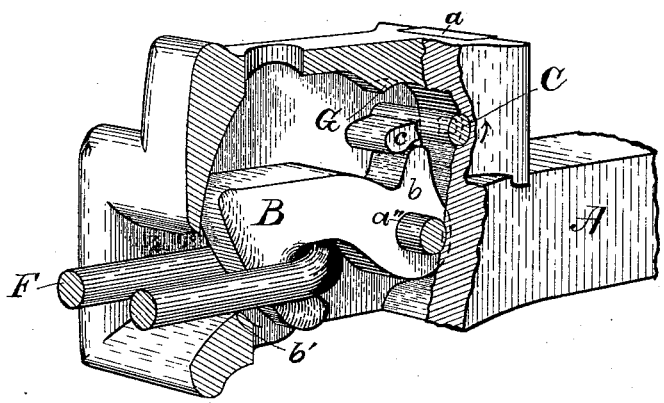

In the accompanying drawings, Figure 1 is a perspective view of a draw-head, partly in section, showing the arrangement of the mechanism in the interior. Fig. 2 is a sectional view of the interior of a draw-head; and Fig. 3 is a side view of the cam-shaft, showing the cams.

In the figures, like reference-marks indicating corresponding parts in the several views, A is the draw-head, which is made of about the interior conformation shown in Fig. 2, and has in the rear end a recess for the insertion of the rubber or other elastic material, $a$. This part of the device is applicable to draw-heads of nearly every construction, but is especially applicable to this form of draw-head, as it is possible to place it directly in the rear of the point of contact of the two draw-heads. Its function is to lessen the shock of contact between the draw-heads and the dead-blocks on the end of the car that receives the shock.

B is the hook, which is pivoted in the draw-head A by the pin $a''$, and comes in contact with the surface E of the cavity in the draw-head, which takes the greater portion of the strain off of the pivot $a''$, and has a projection, $b$, at its rear end for the contact of the cams $c$ and $c'$ on the shaft C, and its forward end is inclined, as shown, in order that the incoming link F will raise it and pass under and engage with it, as shown in Fig. 1. The shaft C should be continued to the sides of the car, and should have at its outer ends cranks or other means for imparting a semi-rotary motion to it.

The shaft C, on being revolved in the direction shown by the arrow, Fig. 1, will, by the contact of the cam $c$ with the projection $b$, raise the hook away from the link and release it, and if carried far enough beyond the point at which the link will be released to bring the largest radius of the cam $c$ in conjunction with the projection $b$, at which time the cam $c'$ will come in contact with the lug G in the top of the cavity in the draw-head to prevent further movement, the hook B will be held in suspension and the link may be entered without coupling, as is often necessary when it is desired to push cars and not couple them; but if it is desired to leave the gravitating hook in a position to engage with an incoming link, the cam-shaft should not be turned to the position above described, in which position the friction of the projection $b$ against the cam will cause the hook to hang in suspension, but should be turned only enough to release the link by raising the hook, from which position the hook will fall by its own weight, and then be in a position to be lifted by and engage with the incoming link.

I have above described the operation of the device when in the draw-head that receives the thrust of the link. I will now describe the device as used to lift and guide the link in the draw-head that carries the link before coupling.

It is a well-known fact and a great obstacle to the general use of automatic couplings as heretofore constructed that the draw-heads of different cars are likely and almost sure to be of different heights, and that the outer end of the link, when uncoupled, will naturally fall below the mouth of the draw-head in which it is placed, which will make its entrance into the corresponding draw-head very difficult. This difficulty I overcome by having on the inner surface of the cavity of the draw-head an upward-projecting portion, $b'$, on either side of the hook B, and a sufficient opening in the bottom for a sufficient depression of the hook from the position at which it will hold the link in a horizontal position, by which depression below this point, the projections $b'$ acting as fulcrums, the outer end of the link will be raised. To produce this depression and the consequent raising of the link I turn the shaft C in a direction opposite to that indicated by the arrow, Fig. 1, which will bring the cam $c'$ into engagement with the projection $b$ on the hook B. Therefore the height of the entering end of the link can be adjusted to suit that of the draw-head with which it is to be coupled.

Having thus described my invention, what I claim as new, and desire to secure by Letters Patent of the United States, is—

1. In a car-coupling, as a means of lifting the link, the hook B and shaft C, having cam $c'$, in combination with the draw-head having projection $b'$, as described.

2. In a car-coupling, the combination of the draw-head A, hook B, shaft C, provided with cams $c$ and $c'$, the stop G, and the projection $b'$, substantially as described, and for the purpose specified.

3. In a car-coupling, the combination of the draw-head A, having projections $b'$ and G and the elastic material $a$ in a recess, the hook B, and the shaft C, having the cams $c$ and $c'$, substantially as and for the purpose shown and described.

In testimony whereof I affix my signature in presence of two witnesses.

REUBEN JONES.

Witnesses:
  H. P. WOOD,
  NED WOOD.